United States Patent
Chen et al.

(10) Patent No.: US 12,549,083 B2
(45) Date of Patent: Feb. 10, 2026

(54) POWER CONVERSION SYSTEM FOR LIMITING THE INPUT BURST CURRENT

(71) Applicant: Richtek Technology Corporation, Zhubei (TW)

(72) Inventors: Yi-Chun Chen, Taoyuan (TW); Kuo-Ping Liu, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 216 days.

(21) Appl. No.: 18/412,996

(22) Filed: Jan. 15, 2024

(65) Prior Publication Data

US 2025/0105718 A1 Mar. 27, 2025

(30) Foreign Application Priority Data

Sep. 26, 2023 (TW) ................................. 112136691

(51) Int. Cl.
*H02M 1/00* (2007.01)
*H02M 1/32* (2007.01)
*H02M 3/157* (2006.01)
*H02M 3/158* (2006.01)

(52) U.S. Cl.
CPC ........... *H02M 1/0009* (2021.05); *H02M 1/32* (2013.01); *H02M 3/157* (2013.01); *H02M 3/158* (2013.01)

(58) Field of Classification Search
CPC ...... H02M 1/0009; H02M 1/32; H02M 3/157; H02M 3/158
See application file for complete search history.

(56) References Cited

U.S. PATENT DOCUMENTS

| | | | |
|---|---|---|---|
| 7,656,623 | B2 | 2/2010 | Fadell et al. |
| 8,693,276 | B2* | 4/2014 | Lai ............ H02J 7/345 365/228 |
| 9,998,009 | B1 | 6/2018 | Lai et al. |
| 10,090,675 | B1* | 10/2018 | Lam ....................... H02M 3/157 |
| 10,892,637 | B2 | 1/2021 | Lu et al. |
| 12,068,686 | B2* | 8/2024 | Zhou .................... H02M 1/0058 |
| 2013/0147277 | A1 | 6/2013 | Popescu-Stanesti et al. |
| 2019/0260224 | A1* | 8/2019 | Lai ........................... H02J 9/061 |

* cited by examiner

*Primary Examiner* — Jue Zhang
*Assistant Examiner* — Lakaisha Jackson
(74) *Attorney, Agent, or Firm* — Tung & Associates

(57) ABSTRACT

A power conversion system for converting an input power to an output power, includes: a current limit circuit clamping an input current of the output power to be not exceeding an input current limit during a current clamping state; and a charge quantity regulation circuit converting the output power to a temporary storage power in a temporary storage capacitor during a charging mode, wherein the charge quantity regulation circuit converts the temporary storage power to generate the output power in collaboration with the current limit circuit during a discharging mode. When the input current reaches a current threshold, the charge quantity regulation circuit enters the discharging mode. During the discharging mode, the charge quantity regulation circuit regulates an output voltage of the output power to a target level, wherein the target level is lower than an input voltage of the input power.

9 Claims, 5 Drawing Sheets

POWER CONVERSION SYSTEM FOR LIMITING THE INPUT BURST CURRENT

CROSS REFERENCE

The present invention claims priority to TW patent application Ser. No. 112136691, filed on Sep. 26, 2023.

BACKGROUND OF THE INVENTION

Field of Invention

The present invention relates to a power conversion system; particularly, it relates to such power conversion system which is capable of limiting the input burst current.

Description of Related Art

The following prior art is pertinent to the present invention: U.S. Pat. No. 10,892,637 B2 "Power supply and power supplying method with power backup" issued to Lu et al. on Jan. 12, 2021.

Please refer to FIG. 1, which shows a schematic block circuit diagram of a conventional power conversion system. As shown in FIG. 1, the conventional power conversion system 900 converts an input power PS to an output power VB, wherein an input current Iin related with the input power PS flows through a switch 90. In the conventional power conversion system 900, a comparator 91 serves to compare a sensing signal Ics related to the input current Iin with a current threshold Ith1, whereas, a comparator 92 serves to compare a feedback signal Vfb related to the output power VB with a voltage threshold Vth. When the conventional power conversion system 900 is in a charging mode (i.e., in a case wherein the sensing signal Ics is lower than the current threshold Ith1 and/or in a case wherein the feedback signal Vfb is greater than the voltage threshold Vth), a switching converter 95 converts the output power VB to generate a power stored in a capacitor C. When the conventional power conversion system 900 is in a discharging mode (i.e., in a case wherein the sensing signal Ics is greater than the current threshold Ith1 and in a case wherein the feedback signal Vfb is lower than the voltage threshold Vth), an AND gate 93 summarizes the comparison results of the comparator 91 and the comparator 92, whereby a pulse width modulation (PWM) control circuit 94 controls the switching converter 95 to release the energy stored in the capacitor C to the output power VB, thus compensating for a short-term inadequacy of the input power PS and keeping an output voltage and/or an output current of the output power VB not to be too low.

The prior art shown in FIG. 1 has the following drawback. In the conventional power conversion system 900, the AND gate 93 decides to control the switching converter 95 to operate in the charging mode or the discharging mode, that is, the conventional power conversion system 900 can start entering the discharging mode only when the sensing signal Ics is greater than the current threshold Ith1 and the feedback signal Vfb is lower than the voltage threshold Vth; therefore, when the output power VB is at a certain low level, the conventional power conversion system 900 will keep switching between the charging mode and the discharging mode, causing high ripples of the input current Iin and severe instability of the conventional power conversion system 900.

In view of the above, to overcome the drawback in the prior art, the present invention proposes a power conversion system which is capable of limiting the input burst current, by regulating the output voltage such that the input current is clamped, whereby the power conversion system of the present invention can stably operate in the discharging mode wherein the input burst current is limited and the power conversion operation is stable.

SUMMARY OF THE INVENTION

From one perspective, the present invention provides a power conversion system, which is configured to operably convert an input power to an output power; the power conversion system comprising: a current limit circuit, which is configured to operably clamp an input current of the input power to be not exceeding an input current limit during a current clamping state; and charge quantity regulation circuit, which is configured to operably convert the output power to a temporary storage power in a temporary storage capacitor during a charging mode, wherein the charge quantity regulation circuit is configured to operably convert the temporary storage power to generate the output power in collaboration with the current limit circuit during a discharging mode, wherein when the input current reaches a current threshold, the charge quantity regulation circuit enters the discharging mode; wherein during the discharging mode, the charge quantity regulation circuit is configured to operably regulate an output voltage of the output power to a target level, wherein the target level is lower than an input voltage of the input power.

In one embodiment, the target level is lower than the input voltage to an extent that the current limit circuit is maintained in the current clamping state.

In one embodiment, the current limit circuit includes: a path switch, wherein a preset difference between the input voltage and the target level is greater than a product of the input current limit multiplied by an ON resistance of the path switch when the path switch is ON, such that the current limit circuit is maintained in the current clamping state.

In one embodiment, the ON resistance is a highest one among all ON resistances of the path switch under different operation conditions and different manufacturing process variations.

In one embodiment, a criterion to judge whether the charge quantity regulation circuit enters the discharging mode does not include: a level of the output voltage.

In one embodiment, the charge quantity regulation circuit is a switching converter including an inductor and at least one switch, wherein the switching converter is configured to operably execute power conversion between the output power and the temporary storage power.

In one embodiment, the switching converter further includes an error amplification circuit, which is configured to operably generate an error amplification signal in accordance with a difference between a reference voltage and the output voltage, so as to control the at least one switch, thereby executing the power conversion between the output power and the temporary storage power; wherein during the discharging mode, the reference voltage is correlated with the target level.

In one embodiment, the current limit circuit further includes a current control circuit, which is configured to operably sense the input current, and is configured to operably control the path switch according to a difference between the input current and a reference signal, thus clamping the input current to be not exceeding the input current limit.

In one embodiment, the current threshold is greater than the input current limit.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
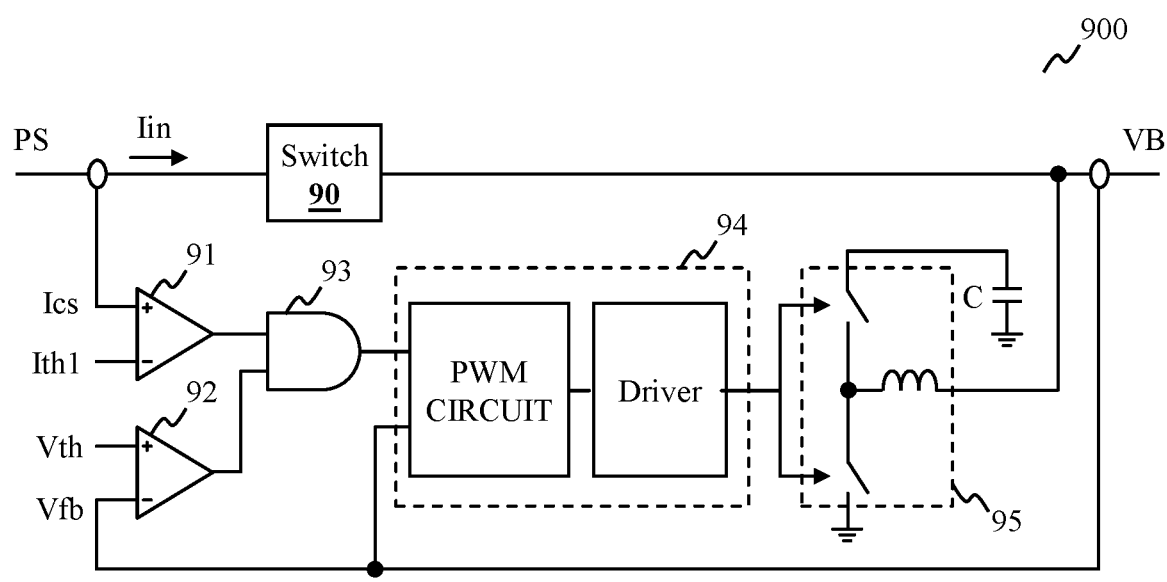
FIG. 1 shows a schematic block circuit diagram of a conventional power conversion system.
Figure 2A:
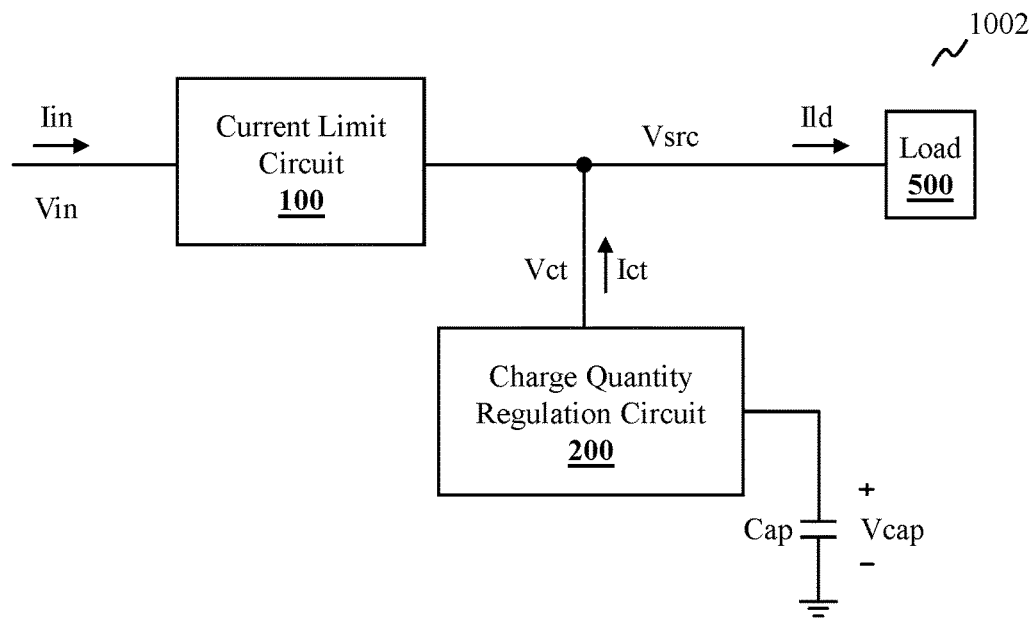
FIG. 2A shows a schematic block diagram of a power conversion system according to an exemplary embodiment of the present invention.

FIG. 2A shows a schematic block diagram of a power conversion system according to an exemplary embodiment of the present invention. In one embodiment, the power conversion system 1002 is configured to operably convert an input power to an output power, and the output power is supplied to a load 500. In one embodiment, the input power includes: an input current Iin as well as an input voltage Vin, whereas, the output power includes: an output current Ild as well as an output voltage Vsrc. In one embodiment, the power conversion system 1002 of the present invention comprises: a current limit circuit 100 and a charge quantity regulation circuit 200.

In one embodiment, the current limit circuit 100 is configured to operably clamp the input current Iin of the input power to be not exceeding an input current limit Ilim during a current clamping state. In one embodiment, the charge quantity regulation circuit 200 is configured to operably convert the output power to a temporary storage power in a temporary storage capacitor Cap during a charging mode, and the charge quantity regulation circuit 200 is configured to operably convert the temporary storage power to generate the output power in collaboration with the current limit circuit 100 during a discharging mode. To elaborate in more detail, in this embodiment, the charge quantity regulation circuit 200 is configured to operably convert the output voltage Vsrc to a temporary storage voltage Vcap in the temporary storage capacitor Cap during the charging mode, and the charge quantity regulation circuit 200 is configured to operably convert the temporary storage voltage Vcap to generate the output voltage Vsrc in collaboration with the current limit circuit 100 during the discharging mode.

Figure 2B:
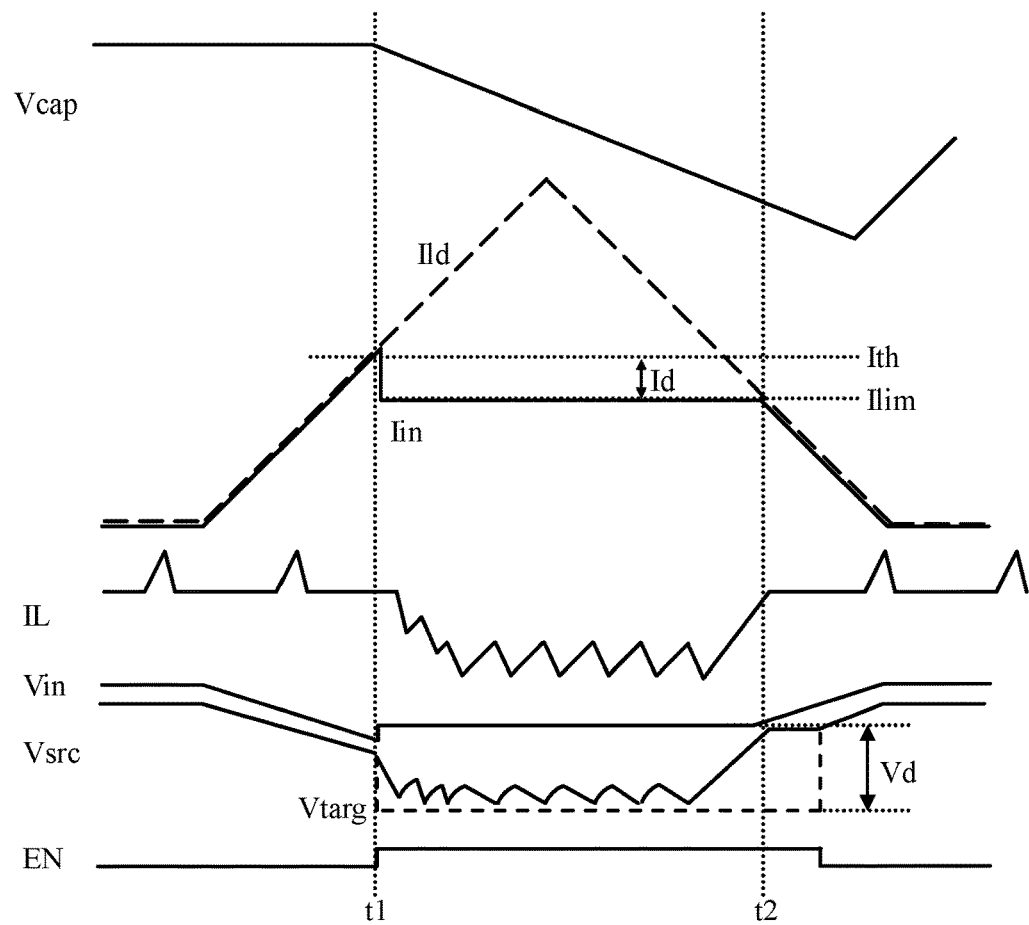
FIG. 2B illustrates signal waveform diagrams depicting signals associated with the operation of a power conversion system according to an exemplary embodiment of the present invention.

Please refer to FIG. 2A along with FIG. 2B. FIG. 2B illustrates signal waveform diagrams depicting signals associated with the operation of a power conversion system according to an exemplary embodiment of the present invention. In one embodiment, when the input current Iin reaches a current threshold Ith (e.g., as shown by time point t1 in FIG. 2B), the charge quantity regulation circuit 200 enters the discharging mode, wherein the charge quantity regulation circuit 200 converts the temporary storage power Vcap to a temporary storage power, so as to generate the output voltage Vsrc in collaboration with the current limit circuit 100. From one perspective, during the discharging mode, the output power is a sum of the input power and the temporary storage power; more specifically, in this embodiment, the output current Ild is a sum of the input current Iin plus a temporary storage current Ict, wherein the temporary storage power includes the temporary storage current Ict and the temporary storage voltage Vcap. In this embodiment, the temporary storage voltage Vcap corresponds to the output voltage Vsrc. In one embodiment, during the discharging mode, the charge quantity regulation circuit 200 regulates the output voltage Vsrc to a target level Vtarg (as indicated by the dashed line shown in FIG. 2B), whereby the current limit circuit 100 clamps the input current Iin to be not exceeding the input current limit Ilim.

It is worthwhile noting that, in one embodiment, the target level Vtarg is lower than the level of the input voltage Vin. In one specific embodiment, the target level Vtarg is lower than the input voltage Vin to an extent that the current limit circuit 100 is maintained in the current clamping state (e.g., the target level Vtarg is lower than the input voltage Vin by a preset difference Vd). It is further worthwhile noting that, in one embodiment, the current threshold Ith is greater than the input current limit Ilim. Consequently, when the output current Ild is greater than the current threshold Ith, the current limit circuit 100 can stably operate in the current clamping state. The details of the above operations will be explained with reference to the embodiments below.

Figure 3:
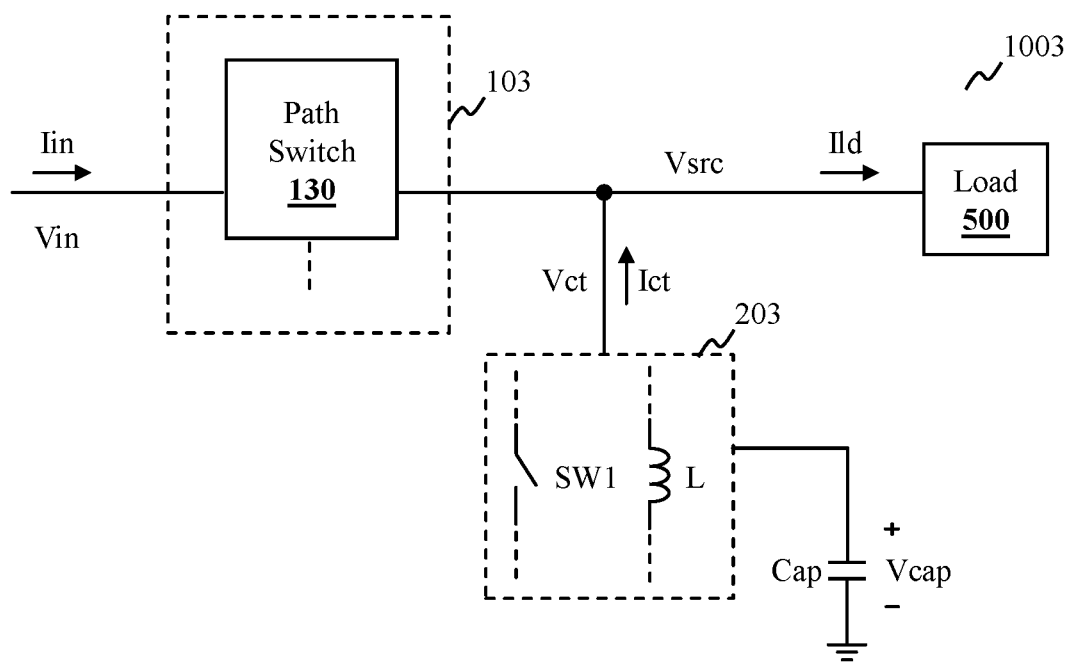
FIG. 3 shows a schematic block diagram of a power conversion system according to an exemplary embodiment of the present invention.

FIG. 3 shows a schematic block diagram of a power conversion system according to an exemplary embodiment of the present invention. In one embodiment, in the power conversion system 1003 shown in FIG. 3, the current limit circuit 103 includes a path switch 130, and the charge quantity regulation circuit 203 is implemented as a switching converter. In one embodiment, the charge quantity regulation circuit 203 includes an inductor and at least one switch SW1, to execute power conversion between an output power (e.g., the output voltage Vsrc) and a temporary storage power (e.g., the temporary storage voltage Vcap).

Figure 4:
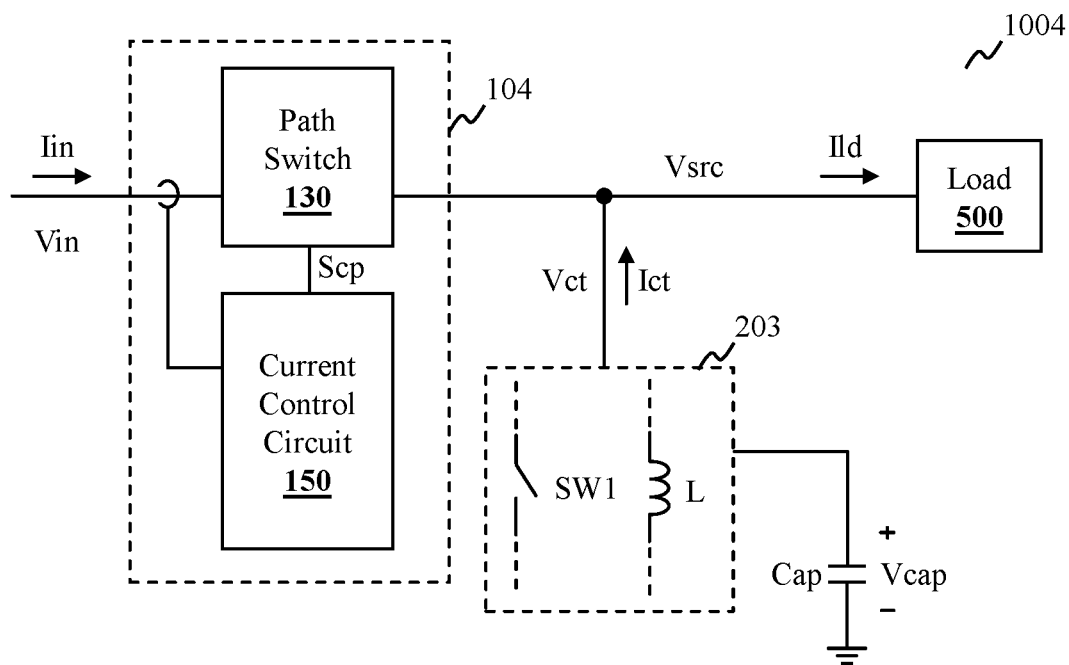
FIG. 4 shows a schematic block diagram of a power conversion system according to an exemplary embodiment of the present invention.

FIG. 4 shows a schematic block diagram of a power conversion system according to an exemplary embodiment of the present invention. The power conversion system 1004 of this embodiment shown in FIG. 4 is similar to the power conversion system 1003 of the embodiment shown in FIG. 3, but is different in that: in this embodiment, the current limit circuit 104 in the power conversion system 1004 shown in FIG. 4 further includes a current control circuit 150, which is configured to operably sense an input current Iin, and the current control circuit 150 is configured to operably generate a path control signal Scp to control a path switch 130 according to a difference between the input current Iin and a reference signal, so as to control the path switch 130 so that the input current Iin is clamped to be not exceeding the input current limit Ilim.

Figure 5:
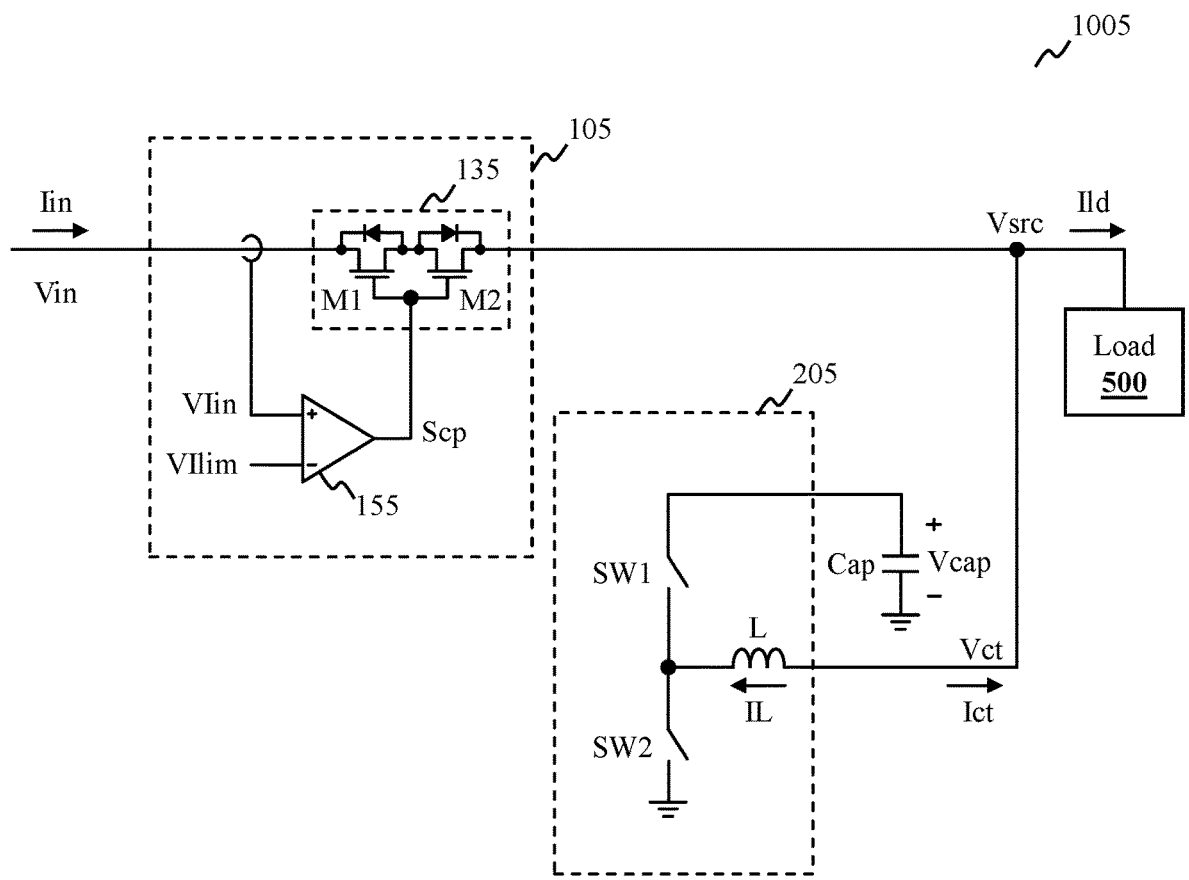
FIG. 5 shows a schematic block circuit diagram of a power conversion system according to a specific exemplary embodiment of the present invention.

FIG. 5 shows a schematic block circuit diagram of a power conversion system according to a specific embodiment of the present invention. The power conversion system 1005 of this embodiment shown in FIG. 5 is a specific embodiment of the power conversion system 1004 of the embodiment shown in FIG. 4. In this specific embodiment, as shown in FIG. 5, the path switch 135 is implemented as two metal oxide semiconductor (MOS) transistors M1 and M2 coupled in series to each other, wherein the body of the MOS transistors M1 and the body of the MOS transistors M2 are reversely connected to each other, so that the body diode of the MOS transistors M1 and the body diode of the MOS transistors M2 will not be turned ON. In one specific embodiment, the current control circuit 155 of the current limit circuit 105 is implemented as an error amplification circuit, wherein the error amplification circuit is configured to operably generate the path control signal Scp according to a difference between a sensing signal Viin related to the input current Iin and a reference signal Vilim, wherein the generated path control signal Scp controls a gate of the path switch 135, so as to clamp the input current Iin to be not exceeding the input current limit Ilim. In this embodiment, the reference signal Vilim is correlated with the input current limit Ilim.

In one specific embodiment, as shown in FIG. 5, the charge quantity regulation circuit 205 is implemented as a switching converter including: an inductor L, a switch SW1 and a switch SW2. In one embodiment, during a charging mode, the charge quantity regulation circuit 205 serves to function as a boost converter. In this case, the boost converter (i.e., the charge quantity regulation circuit 205) periodically switches the inductor L by the switch SW1 and the switch SW2, thus converting the output voltage Vsrc to generate the temporary storage voltage Vcap in the temporary storage capacitor Cap during the charging mode. In other words, during the charging mode, the charge quantity regulation circuit 205 serves to boost-convert the output voltage Vsrc, so as to charge the temporary storage capacitor Cap. In one embodiment, during a discharging mode, the charge quantity regulation circuit 205 serves to function as a buck converter. In this case, the buck converter (i.e., the charge quantity regulation circuit 205) periodically switches the inductor L by the switch SW1 and the switch SW2, so as to convert the temporary storage voltage Vcap to generate the output voltage Vsrc in collaboration with the current limit circuit 105 during the discharging mode. In other words, during the discharging mode, the charge quantity regulation circuit 205 serves to buck-convert the temporary storage voltage Vcap stored in the temporary storage capacitor Cap, so as to discharge the temporary storage capacitor Cap. In one embodiment, during the charging mode or the discharging mode, the temporary storage voltage Vcap is greater than or equal to the output voltage Vsrc.

Figure 6:
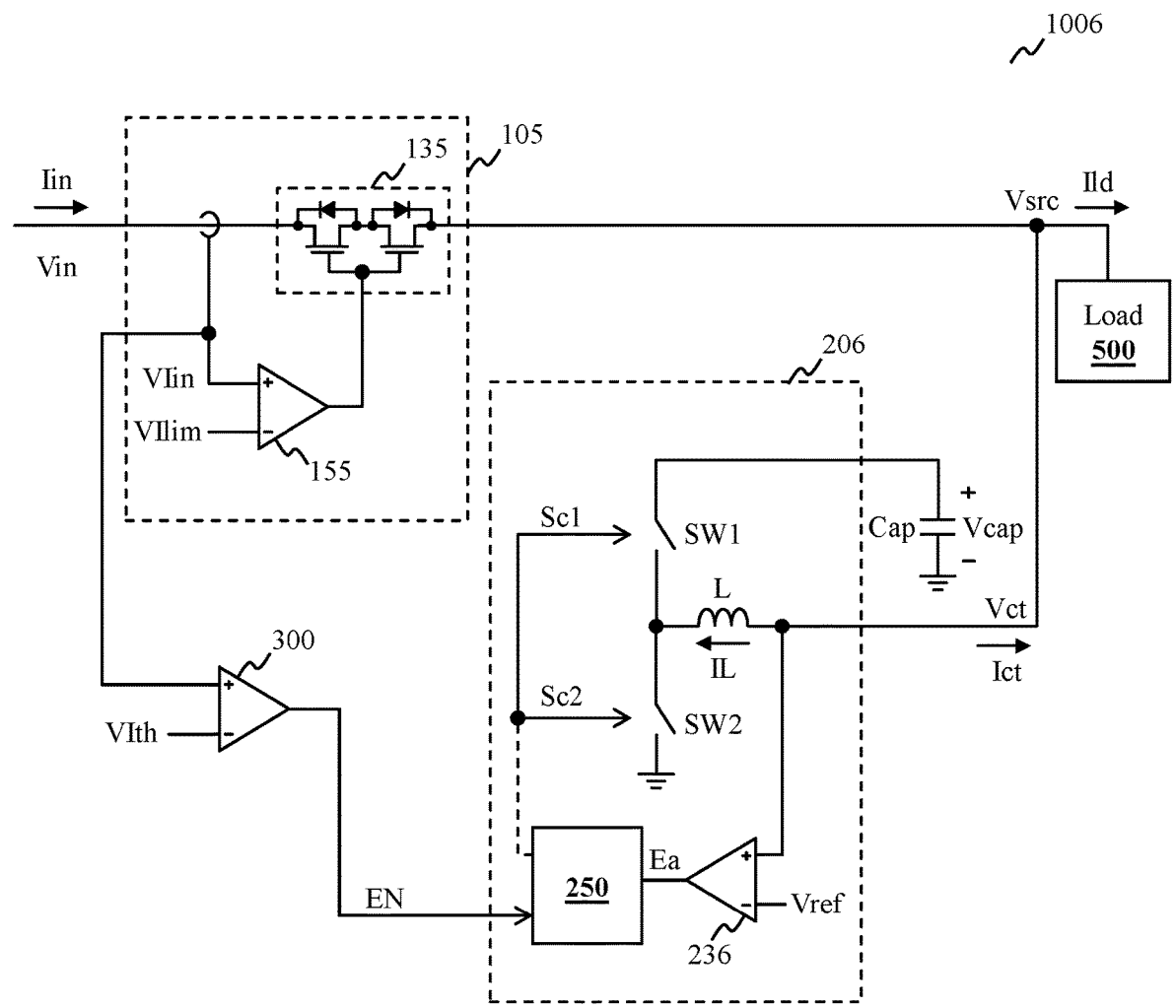
FIG. 6 shows a schematic block circuit diagram of a power conversion system according to a specific embodiment of the present invention.

FIG. 6 shows a schematic block circuit diagram of a power conversion system according to a specific exemplary embodiment of the present invention. The power conversion system 1006 of this embodiment shown in FIG. 6 is similar to the power conversion system 1005 of the embodiment shown in FIG. 5, but is different in that: as compared to the power conversion system 1005 shown in FIG. 5, in this embodiment of FIG. 6, this charge quantity regulation circuit 206 (which is a switching converter) in the power conversion system 1006 further includes: an error amplification circuit 236 and a modulation control circuit 250. In one specific embodiment, the error amplification circuit 236 is configured to operably generate an error amplification signal Ea in accordance with a difference between a reference voltage Vref and a signal related to the output voltage Vsrc. The modulation control circuit 250 is configured to operably generate a switching signal Sc1 and a switching signal Sc2 based upon the error amplification signal Ea, wherein the generated switching signal Sc1 and switching signal Sc2 serve to respectively control the switch SW1 and the switch SW2, thereby executing the power conversion between the output power (e.g., the output voltage Vsrc) and the temporary storage power (e.g., the temporary storage voltage Vcap). In one embodiment, the modulation control circuit 250 is configured to operably generate the switching signal Sc1 and the switching signal Sc2 in a pulse width modulation (PWM) form. During a discharging mode, the aforementioned reference voltage Vref is correlated with a target level Vtarg. In this embodiment, during the discharging mode, the aforementioned reference voltage Vref is equal to the target level Vtarg, and the aforementioned signal related to the output voltage Vsrc is the output voltage Vsrc itself.

In one specific embodiment, as shown in FIG. 6, the power conversion system 1006 further comprises a comparator 300, which is configured to operably compare the sensing signal Viin with a threshold voltage Vith, so as to generate an enable signal EN. When the level of the sensing signal Viin is higher than the level of the threshold voltage Vith, the enable signal EN informs the modulation control circuit 250 to control the switch SW1 and the switch SW2 to enter the discharging mode, so as to discharge the temporary storage capacitor Cap. In one embodiment, the sensing signal Viin is correlated with the input current Iin, whereas, the threshold voltage Vith is correlated with the current threshold Ith.

Please refer to FIG. 6 along with FIG. 2B. In one embodiment, prior to the time point t1 shown in FIG. 2B, the charge quantity regulation circuit 206 operate in a charging mode, wherein the level of an inductor current IL has a positive sign. In one embodiment, in a case when the level of the sensing signal Viin is higher than the level of the threshold voltage Vith, which indicates that the input current Iin (as indicated by the second waveform illustrated as a solid line in FIG. 2B) is higher than the current threshold Ith, thus, at the time point t1 shown in FIG. 2B, the charge quantity regulation circuit 206 enters a discharging mode, whereas, a current limit circuit 105 enters a current clamping state. As shown by the time interval from the time point t1 to the time point t2 in FIG. 2B (which is indicative of the discharging mode), the level of the inductor current IL has a negative sign, wherein the inductor current IL corresponds to the aforementioned temporary storage current Ict (but having opposite phases). On the other hand, because the input current Iin is being clamped not exceeding the input current limit Ilim, in the discharging mode from the time point t1 to the time point t2 in FIG. 2B, the output current Ild is a sum of the input current Iin and an absolute value of the inductor current IL, and besides, during the discharging mode, the level of the temporary storage voltage Vcap is decreasing.

In one embodiment, when the output current Ild is once again lower than the input current limit Ilim (e.g., as shown by the time point t2 in FIG. 2B), the charge quantity regulation circuit 206 switches back to the charging mode. It is worthwhile noting that, neither the criterion to enter the discharging mode nor the criterion to enter the charging mode includes a judgment of a level of the output voltage Vsrc.

In one embodiment, the output current Ild is greater than the current threshold Ith and there is a current difference Id between the output current Ild and the current threshold Ith, wherein such current difference Id is set large to an extent that, when the level of the input current Iin is greater than a level of the current threshold Ith to cause the charge quantity regulation circuit 206 to enter the discharging mode, it can be ensured that the input current Iin is kept to be clamped not exceeding the input current limit Ilim, to avoid input burst current; that is, this can prevent the charge quantity regulation circuit 206 from keeping switching back and forth between the charging mode and the discharging mode. Consequently, when the output current Ild is greater than the current threshold Ith, the current limit circuit 100 of the power conversion system of the present invention can stably operate in the current clamping state.

In one embodiment, as shown by the time interval from the time point t1 to the time point t2 in FIG. 2B (which is indicative of the discharging mode), the charge quantity regulation circuit 206 regulates the output voltage Vsrc to the target level Vtarg via the error amplification circuit 236, wherein the preset difference Vd between the input voltage Vin and the target level Vtarg is greater than a product of the input current limit Ilim multiplied by the ON resistance of the path switch 135 when the path switch 135 is ON, such that the current limit circuit 105 is maintained in the current clamping state. That is, in this embodiment, the product of the input current limit Ilim multiplied by the ON resistance of the path switch 135 which is ON is the drain-source voltage of the path switch 135, and the preset difference Vd between the input voltage Vin and the target voltage Vtarg is the target drain-source voltage which is intended to be regulated. From another perspective, the current limit circuit 100 serves to limit the drain-source voltage of the path switch 135 to be not greater than the target drain-source voltage of the path switch 135. That is, the drain-source voltage of the path switch 135 is clamped at the target drain-source voltage, such that the input current Iin is clamped to be not exceeding the input current limit Ilim.

It is worthwhile mentioning that: the aforementioned ON resistance is the highest one among all ON resistances of the path switch 135 under different operation conditions and under different manufacturing process variations, so as to ensure that the preset difference Vd between the input voltage Vin and the target level Vtarg is greater than a product of the input current limit Ilim multiplied by the ON resistance of the path switch 135 when the path switch 135 is ON.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion system, which is configured to operably convert an input power to an output power; the power conversion system comprising:
    a current limit circuit, which is configured to operably clamp an input current of the input power to be not exceeding an input current limit during a current clamping state; and
    a charge quantity regulation circuit, which is configured to operably convert the output power to a temporary storage power in a temporary storage capacitor during a charging mode, wherein the charge quantity regulation circuit is configured to operably convert the temporary storage power to generate the output power in collaboration with the current limit circuit during a discharging mode, wherein when the input current reaches a current threshold, the charge quantity regulation circuit enters the discharging mode;
    wherein during the discharging mode, the charge quantity regulation circuit is configured to operably regulate an output voltage of the output power to a target level, wherein the target level is lower than an input voltage of the input power.

2. The power conversion system as claimed in claim 1, wherein the target level is lower than the input voltage to an extent that the current limit circuit is maintained in the current clamping state.

3. The power conversion system as claimed in claim 2, wherein the current limit circuit includes: a path switch, wherein a preset difference between the input voltage and the target level is greater than a product of the input current limit multiplied by an ON resistance of the path switch when the path switch is ON, such that the current limit circuit is maintained in the current clamping state.

4. The power conversion system as claimed in claim 3, wherein the ON resistance is a highest one among all ON resistances of the path switch under different operation conditions and different manufacturing process variations.

5. The power conversion system as claimed in claim 1, wherein a criterion to judge whether the charge quantity regulation circuit enters the discharging mode does not include: a level of the output voltage.

6. The power conversion system as claimed in claim 3, wherein the charge quantity regulation circuit is a switching converter including an inductor and at least one switch, wherein the switching converter is configured to operably execute power conversion between the output power and the temporary storage power.

7. The power conversion system as claimed in claim 6, wherein the switching converter further includes:
    an error amplification circuit, which is configured to operably generate an error amplification signal in accordance with a difference between a reference voltage and the output voltage, so as to control the at least one switch, thereby executing the power conversion between the output power and the temporary storage power;
    wherein during the discharging mode, the reference voltage is correlated with the target level.

8. The power conversion system as claimed in claim 3, wherein the current limit circuit further includes:
   a current control circuit, which is configured to operably sense the input current, and is configured to operably control the path switch according to a difference between the input current and a reference signal, thus clamping the input current to be not exceeding the input current limit.

9. The power conversion system as claimed in claim 1, wherein the current threshold is greater than the input current limit.

\* \* \* \* \*